(12) United States Patent
Ko et al.

(10) Patent No.: US 11,679,746 B2
(45) Date of Patent: Jun. 20, 2023

(54) BRAKING CONTROL APPARATUS AND METHOD FOR VEHICLE

(71) Applicant: HYUNDAI MOBIS CO., LTD., Seoul (KR)

(72) Inventors: Ji Weon Ko, Yongin-si (KR); Jin Ho Seong, Yongin-si (KR)

(73) Assignee: HYUNDAI MOBIS CO., LTD., Seoul (KR)

( * ) Notice: Subject to any disclaimer, the term of this patent is extended or adjusted under 35 U.S.C. 154(b) by 764 days.

(21) Appl. No.: 16/656,845

(22) Filed: Oct. 18, 2019

(65) Prior Publication Data
US 2020/0122696 A1 Apr. 23, 2020

(30) Foreign Application Priority Data
Oct. 22, 2018 (KR) .......................... 10-2018-0125928

(51) Int. Cl.
| | |
|---|---|
| *B60T 8/172* | (2006.01) |
| *B60T 7/04* | (2006.01) |
| *B60T 8/32* | (2006.01) |
| *B60T 8/17* | (2006.01) |
| *B60T 8/40* | (2006.01) |

(52) U.S. Cl.
CPC .............. *B60T 8/172* (2013.01); *B60T 7/042* (2013.01); *B60T 8/17* (2013.01); *B60T 8/3255* (2013.01); *B60T 8/4081* (2013.01); *B60T 2270/82* (2013.01)

(58) Field of Classification Search
CPC .... B60T 7/042; B60T 2220/04; B60T 8/4072; B60T 8/4081; B60T 8/4086; B60T 8/409; B60T 2270/82; B60T 8/17; B60T 8/172; B60T 8/3255; G01L 5/225
See application file for complete search history.

(56) References Cited

U.S. PATENT DOCUMENTS

| | | | | |
|---|---|---|---|---|
| 5,558,409 | A | * | 9/1996 | Walenty ................. B60T 7/042 303/155 |
| 6,309,031 | B1 | | 10/2001 | Crombez et al. |
| 8,364,367 | B2 | | 1/2013 | Karnjate et al. |
| 8,521,391 | B2 | * | 8/2013 | Krueger ............... B60T 8/3255 701/79 |

(Continued)

FOREIGN PATENT DOCUMENTS

| | | |
|---|---|---|
| DE | 60036269 | 6/2008 |
| DE | 102008051452 | 5/2009 |

(Continued)

*Primary Examiner* — Bradley T King
(74) *Attorney, Agent, or Firm* — H.C. Park & Associates, PLC

(57) ABSTRACT

A braking control apparatus for a vehicle including: a pedal stroke sensing unit configured to sense a pedal stroke of a brake pedal; a pedal simulator pressure sensing unit configured to sense pressure of a pedal simulator that provides a reaction force in response to a stepping force of the brake pedal; and a control unit configured to apply different computation methods by selectively utilizing a pedal stroke STR sensed by the pedal stroke sensing unit and pedal simulator pressure P_SIM sensed by the pedal simulator pressure sensing unit at a plurality of stages defined while the brake pedal is pressed and released, and decide required braking pressure P which is required for braking the vehicle.

10 Claims, 6 Drawing Sheets

(56) References Cited

U.S. PATENT DOCUMENTS

| | | | | |
|---|---|---|---|---|
| 8,523,297 B2 * | 9/2013 | Morishita | | B60L 7/26 303/151 |
| 8,812,211 B2 * | 8/2014 | Svensson | | B60T 8/17 303/166 |
| 9,193,343 B2 * | 11/2015 | Jung | | B60T 13/662 |
| 10,328,913 B2 * | 6/2019 | Li | | B60T 8/172 |
| 10,464,536 B2 * | 11/2019 | Akita | | B60T 8/3255 |
| 2002/0180262 A1 * | 12/2002 | Hara | | B60T 8/17616 303/113.1 |
| 2013/0289845 A1 * | 10/2013 | Ajiro | | B60T 8/3265 701/70 |
| 2014/0167494 A1 * | 6/2014 | Jeon | | B60T 13/686 303/10 |
| 2014/0375114 A1 * | 12/2014 | Daniels | | B60T 8/17 303/10 |
| 2015/0112567 A1 * | 4/2015 | Toelge | | B60T 13/662 701/70 |
| 2015/0321649 A1 * | 11/2015 | Jeon | | B60T 8/3275 701/70 |
| 2017/0297547 A1 * | 10/2017 | Goto | | B60T 13/745 |
| 2018/0297613 A1 * | 10/2018 | Moia | | B60W 50/16 |
| 2019/0061722 A1 * | 2/2019 | Kaihara | | B60T 8/409 |
| 2020/0130663 A1 * | 4/2020 | Ye | | B60T 13/686 |
| 2020/0216051 A1 * | 7/2020 | Mannherz | | B60T 8/173 |
| 2020/0262402 A1 * | 8/2020 | Lee | | B60T 8/4081 |
| 2020/0331447 A1 * | 10/2020 | Lee | | B60T 8/172 |
| 2020/0353908 A1 * | 11/2020 | Street | | G05G 1/38 |
| 2021/0107438 A1 * | 4/2021 | Kim | | B60T 7/042 |
| 2021/0179040 A1 * | 6/2021 | Hwang | | B60T 13/142 |
| 2021/0197842 A1 * | 7/2021 | Michaelsen | | G05G 5/03 |
| 2022/0105909 A1 * | 4/2022 | Maruyama | | B60T 8/171 |

FOREIGN PATENT DOCUMENTS

| | | |
|---|---|---|
| DE | 102017202361 | 8/2018 |
| KR | 10-2014-0142478 | 12/2014 |
| WO | WO-2018149558 A1 * | 8/2018 |

* cited by examiner

BRAKING CONTROL APPARATUS AND METHOD FOR VEHICLE

CROSS-REFERENCES TO RELATED APPLICATION

This application claims priority from and the benefit of Korean Patent Application No. 10-2018-0125928, filed on Oct. 22, 2018, which is hereby incorporated by reference for all purposes as if set forth herein.

BACKGROUND

Field

Exemplary embodiments relates to a braking control apparatus and method for a vehicle, and more particularly, to a braking control apparatus and method for a vehicle, which can decide required braking pressure which is required for braking a vehicle.

Discussion of the Background

Recently, eco-friendly vehicles such as an EV (Electric Vehicle), PHEV (Plug-in Hybrid Electric Vehicle) and HEV (Hybrid Electric Vehicle) have become common, and research is being continuously conducted on a regenerative brake system applied to the eco-friendly vehicles.

In such an eco-friendly vehicle, required braking pressure which is required for braking a vehicle (that is, braking hydraulic pressure which is formed by a master cylinder and applied to a wheel cylinder) is decided by a pedal stroke of a brake pedal, sensed by a pedal stroke sensor, and a brake ECU (Electronic Control Unit) applied to the vehicle drives an actuator such as an electric booster (motor) to form the required braking pressure through the master cylinder, thereby braking the vehicle.

In addition, when a driver steps on the brake pedal, a pedal feel is delivered to the driver through a reaction force formed by a rubber damper or spring of a pedal simulator.

In the related art, the required braking pressure is decided through a method of applying a pedal stroke sensed by the pedal stroke sensor to predetermined map information. Therefore, braking feel tuning and a degree of freedom in design are inevitably limited, and the driver's stepping force on the brake pedal may not be reflected into the formation of the required braking pressure.

The related art is disclosed in Korean Patent Application Publication No. 10-2014-0142478 published on Dec. 12, 2014.

The above information disclosed in the Background section is only for enhancement of understanding of the background of the invention and, therefore, it may contain information that does not constitute prior art.

SUMMARY

Exemplary embodiments of the present invention provide a braking control apparatus and method for a vehicle, which can solve the problem of the related art in that the braking feel tuning and the degree of freedom in design are limited and a driver's stepping force on the brake pedal is not reflected into the formation of the required braking pressure because the required braking pressure is decided based on the pedal stroke.

In one embodiment, a braking control apparatus for a vehicle may include: a pedal stroke sensing unit configured to sense a pedal stroke of a brake pedal; a pedal simulator pressure sensing unit configured to sense pressure of a pedal simulator that provides a reaction force in response to a stepping force of the brake pedal; and a control unit configured to apply different computation methods by selectively utilizing a pedal stroke STR sensed by the pedal stroke sensing unit and pedal simulator pressure P_SIM sensed by the pedal simulator pressure sensing unit at a plurality of stages defined while the brake pedal is pressed and released, and decide required braking pressure P which is required for braking the vehicle.

The plurality of stages may include a first stage in which the pedal stroke is equal to or less than a preset first reference pedal stroke STR_A.

At the first stage, the control unit may decide the required braking pressure P by applying the pedal stroke STR sensed by the pedal stroke sensing unit to preset stroke-pressure relation information.

The plurality of stages may further include a second stage in which the pedal stroke exceeds the first reference pedal stroke STR_A.

At the second stage, the control unit may decide the required braking pressure P through a method of applying the pedal simulator pressure P_SIM sensed by the pedal simulator pressure sensing unit to a slope which is decided based on pedal simulator pressure P_SIM_A is sensed by the pedal simulator pressure sensing unit at the first reference pedal stroke STR_A, required braking pressure P_A decided at the first reference pedal stroke STR_A, the preset maximum required braking pressure P_MAX, and the maximum pedal simulator pressure P_SIM_MAX as pedal simulator pressure corresponding to the maximum required braking pressure P_MAX.

The plurality of stages may further include a third stage from a pedal stroke STR_B, which is sensed by the pedal stroke sensing unit at the time that the required braking pressure P decided while the brake pedal is released at the second stage reaches the required braking pressure P_A, to a second reference pedal stroke STR_C preset to less than the first reference pedal stroke STR_A.

At the third stage, the control unit may decide the required braking pressure P through a method of applying the pedal stroke STR sensed by the pedal stroke sensing unit to a slope which is decided based on the pedal stroke STR_B, the required braking pressure P_A, the second reference pedal stroke STR_C, and required braking pressure P_B decided by the relation information at the second reference pedal stroke STR_C.

The plurality of stages may further include a fourth stage from pedal simulator pressure P_SIM_B, which is sensed by the pedal simulator pressure sensing unit at the time that the brake pedal starts to be repressed while the brake pedal is released at the third stage, to the maximum pedal simulator pressure P_SIM_MAX.

At the fourth stage, the control unit may decide the required braking pressure P through a method of applying the pedal simulator pressure P_SIM sensed by the pedal simulator pressure sensing unit to a slope which is decided based on the pedal simulator pressure P_SIM_B, required braking pressure P_C decided at the time that the brake pedal starts to be repressed, the maximum pedal simulator pressure P_SIM_MAX, and the maximum required braking pressure P_MAX.

In another embodiment, a braking control method for a vehicle may include: sensing, by a pedal stroke sensing unit, a pedal stroke of a brake pedal; sensing, by a pedal simulator pressure sensing unit, pressure of a pedal simulator that provides a reaction force in response to a stepping force of the brake pedal; and applying, by a control unit, different computation methods by selectively utilizing a pedal stroke STR sensed by the pedal stroke sensing unit and pedal simulator pressure P_SIM sensed by the pedal simulator pressure sensing unit at a plurality of stages defined while the brake pedal is pressed and released, and deciding required braking pressure P which is required for braking the vehicle.

In accordance with the present embodiments, the braking control apparatus and method can decide the required braking pressure by selectively utilizing the pedal stroke and the pedal simulator pressure, thereby tuning the braking feel and securing the degree in freedom in design. Furthermore, the braking control apparatus and method can reflect an additional braking intention based on the stepping force of the driver into the formation of the required braking pressure.

It is to be understood that both the foregoing general description and the following detailed description are exemplary and are intended to provide further explanation of the invention as claimed.

BRIEF DESCRIPTION OF THE DRAWINGS

The accompanying drawings, which are included to provide a further understanding of the invention and are incorporated in and constitute a part of this specification, is illustrate embodiments of the invention, and together with the description serve to explain the principles of the invention.

DETAILED DESCRIPTION OF THE ILLUSTRATED EMBODIMENTS

Figure 1:
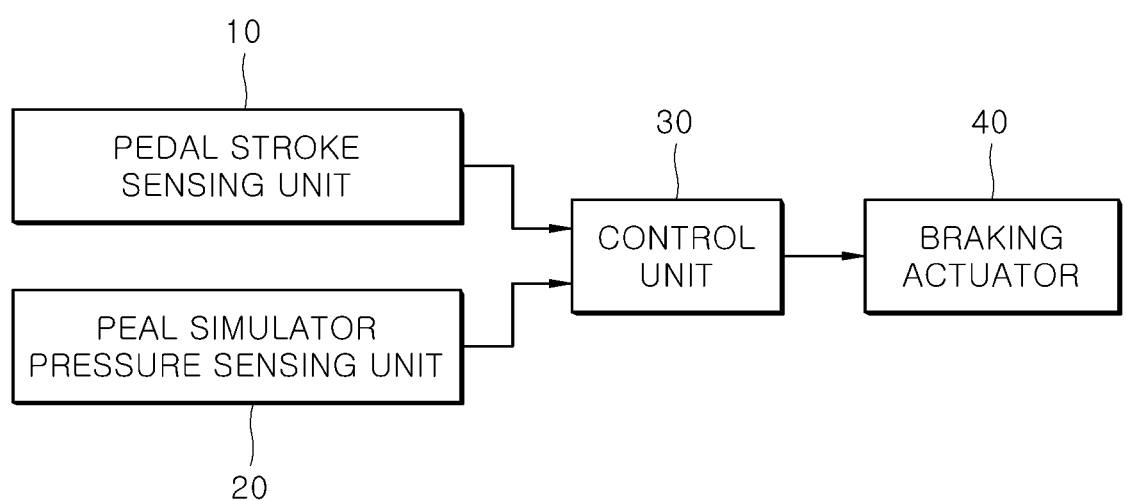
FIG. 1 is a block diagram illustrating a braking control apparatus for a vehicle in accordance with an embodiment of the present invention.

The invention is described more fully hereinafter with reference to the accompanying drawings, in which embodiments of the invention are shown. This invention may, however, be embodied in many different forms and should not be construed as limited to the embodiments set forth herein. Rather, these embodiments are provided so that this disclosure is thorough, and will fully convey the scope of the invention to those skilled in the art Like reference numerals in the drawings denote like elements.

It will be understood that for purposes of this disclosure, "at least one of X, Y, and Z" can be construed as X only, Y only, Z only, or any combination of two or more items X, Y, and Z (e.g., XYZ, XYY, YZ, ZZ). Unless particularly described to the contrary, the term "comprise", "configure", "have", or the like, which are described herein, will be understood to imply the inclusion of the stated components, and therefore should be construed as including other components, and not the exclusion of any other elements.

Hereafter, a braking control apparatus and method for a vehicle in accordance with an embodiment of the present invention will be described in detail with reference to the accompanying drawings. It should be noted that the drawings are not to precise scale and may be exaggerated in thickness of lines or sizes of components for descriptive convenience and clarity only. Furthermore, the terms as used herein are defined by taking functions of the invention into account and can be changed according to the custom or intention of users or operators. Therefore, definition of the terms should be made according to the overall disclosures set forth herein.

FIG. 1 is a block diagram illustrating a braking control apparatus for a vehicle in accordance with an embodiment of the present invention, and FIGS. 2 to 5 are graphs for describing a process in which the braking control apparatus for a vehicle in accordance with the embodiment of the present invention decides required braking pressure at respective stages.

Referring to FIG. 1, the braking control apparatus for a vehicle in accordance with the embodiment of the present invention may include a pedal stroke sensing unit 10, a pedal simulator pressure sensing unit 20, a control unit 30 and a braking actuator 40.

The pedal stroke sensing unit 10 may sense a pedal stroke of a brake pedal, which is formed as the brake pedal is pressed by a driver, and transfer the sensed pedal stroke to the control unit 30 which will be described below. The pedal stroke sensing unit 10 may be implemented as a pedal stroke sensor which senses a pedal stroke by detecting a rotation angle of a pedal arm based on a zero point.

The pedal simulator pressure sensing unit 20 may sense pressure of a pedal simulator which provides a reaction force in response to a stepping force of the brake pedal by the driver, and transfer the sensed pressure to the control unit 30. The pedal simulator pressure is sensing unit 20 may be implemented as a pressure sensor formed on a flow path between the pedal simulator and a reservoir (not illustrated), and sense the pedal simulator pressure.

The control unit 30 may apply different computation methods by selectively utilizing a pedal stroke STR sensed by the pedal stroke sensing unit 10 and pedal simulator pressure P_SIM sensed by the pedal simulator pressure sensing unit 20 at a plurality of stages defined while the brake pedal is pressed and released, thereby deciding required braking pressure P which is required for braking the vehicle (that is, braking hydraulic pressure formed by a master cylinder and applied to a wheel cylinder). The control unit 30 may be implemented as a brake ECU (Electronic Control Unit) for controlling braking of the vehicle.

Figure 2:
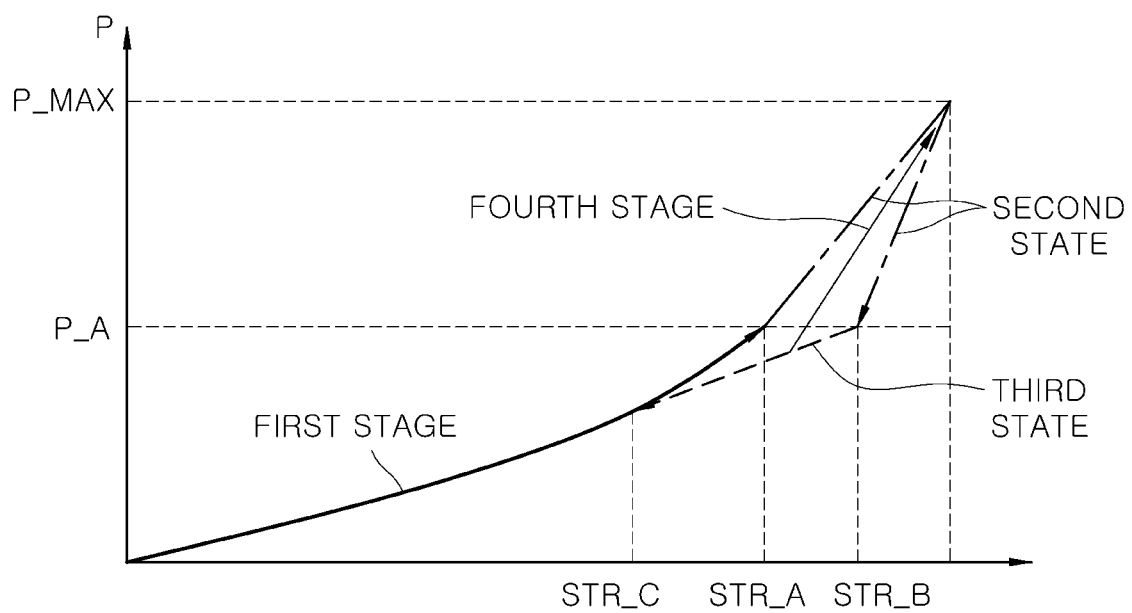
FIGS. 2, 3, 4, and 5 are graphs for describing a process in which the braking control apparatus for a vehicle in accordance with the embodiment of the present invention decides required braking pressure at respective stages.

First, the plurality of stages defined while the brake pedal is pressed and released will be comprehensively described with reference to FIG. 2.

At a first stage in which the pedal stroke is equal to or less than a preset first reference pedal stroke STR_A, the pedal stroke STR sensed by the pedal stroke sensing unit 10 may be used to decide the required braking pressure P.

At a second stage in which the pedal stroke exceeds the first reference pedal stroke STR_A, the pedal simulator pressure P_SIM sensed by the pedal simulator pressure sensing unit 20 may be used to decide the required braking pressure P.

At a third stage corresponding to a process in which the second stage is switched to the first stage when the brake pedal is released, the pedal stroke STR sensed by the pedal stroke sensing unit 10 may be used to decide the required braking pressure P.

At a fourth stage in which the brake pedal is repressed while being released at the third stage, the pedal simulator pressure P_SIM sensed by the pedal simulator pressure sensing unit 20 may be used to decide the required braking pressure P.

Based on the above comprehensive descriptions of the first to fourth stages, a process of calculating the required braking pressure at each of the stages will be described while the first to fourth stages are specifically defined. Hereafter, it should be noted that terms are clearly distinguished by reference numerals. For reference, the horizontal axes of the graphs illustrated in FIGS. 2 and 4 may indicate the pedal stroke in that, at the first and third stages, the pedal stroke STR sensed by the pedal stroke sensing unit 10 is used to the decide the required braking pressure P, and the horizontal axes of the graphs illustrated in FIGS. 3 and 5 may indicate the pedal simulator pressure in that, at the second and fourth stages, the pedal simulator pressure P_SIM sensed by the pedal simulator pressure sensing unit 20 is used to decide the required braking pressure P.

First, the process of calculating the required braking pressure at the first stage will be described.

At the first stage in which the pedal stroke is equal to or less than the preset first reference pedal stroke STR_A, the pedal stroke STR sensed by the pedal stroke sensing unit 10 may be used to decide the required braking pressure P.

The first reference pedal stroke STR_A serving as a reference value for distinguishing between the first and second stages may be selected in various manners depending on a designer's intention, and set in the control unit 30 in advance. For example, during actual braking of the vehicle, a driver may intend to perform braking based on a reaction force delivered through the pedal stimulator as the stepping amount of the brake pedal is increased. Therefore, when the pedal stroke exceeds a predetermined value, a parameter used for forming the required braking pressure may be converted from the pedal stroke into the pedal simulator pressure, in order to reflect the driver's braking intention. In consideration of such an aspect, the predetermined value may be selected based on a designer's intention and am experimental result, and set as the first reference pedal stroke STR_A in the control unit 30 in advance.

Therefore, the control unit 30 may decide the required braking pressure P by applying the pedal stroke STR sensed through the pedal stroke sensing unit 10 to preset 'stroke-pressure relation information', at the first stage. FIG. 2 illustrates the 'stroke-pressure relation information' as a graph showing the required braking pressure depending on the pedal stroke, and the 'stroke-pressure relation information' may be preset in various manners (a map, a lookup table or a function of the required braking pressure for the pedal stroke) based on experimental results of the designer.

As will be described below, the braking control apparatus may enter the first stage after the pedal stroke STR sensed by the pedal stroke sensing unit 10 reaches a preset second reference pedal stroke STR_C at the third stage where the brake pedal is released. Thus, the control unit 30 may decide the required braking pressure P by applying the pedal stroke STR sensed by the pedal stroke sensing unit 10 to the 'stroke-pressure relation information' as described above.

Next, a process of calculating the required braking pressure at the second stage will be described.

At the second stage in which the pedal stroke exceeds the first reference pedal stroke STR_A, the pedal simulator pressure P_SIM sensed by the pedal simulator pressure sensing unit 20 may be used to decide the required braking pressure P.

Figure 3:
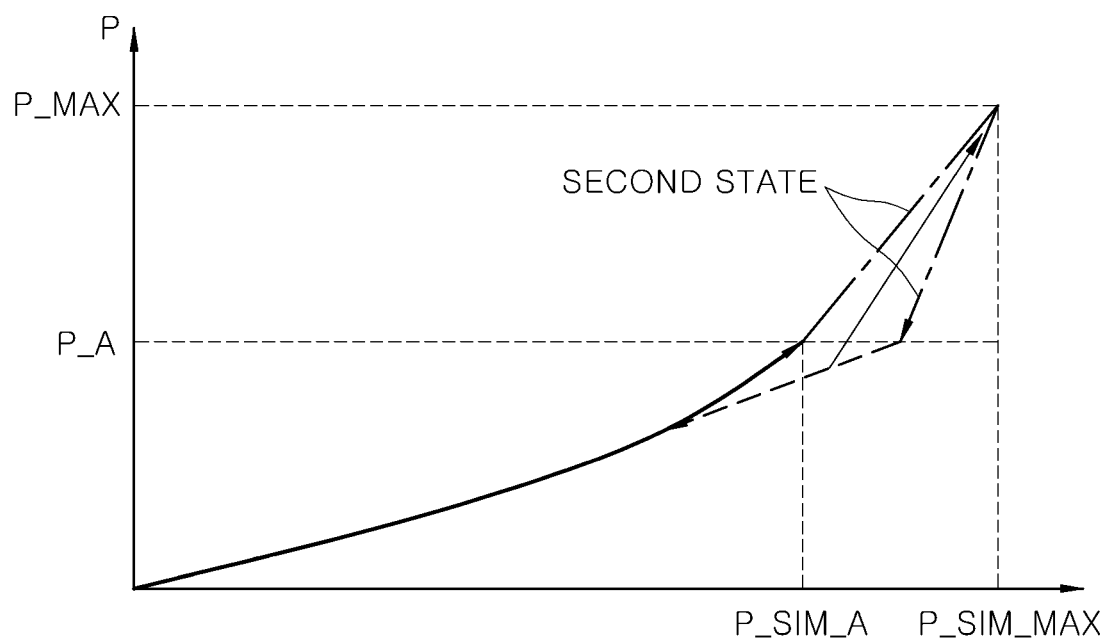

Referring to FIG. 3, at the second stage, the control unit 30 may decide the required braking pressure P through a method of applying the pedal simulator pressure P_SIM sensed by the pedal simulator pressure sensing unit 20 to a slope which is decided based on pedal is simulator pressure P_SIM_A sensed by the pedal simulator pressure sensing unit 20 at the first reference pedal stroke STR_A, required braking pressure P_A decided at the first reference pedal stroke STR_A, the preset maximum required braking pressure P_MAX, and the maximum pedal simulator pressure P_SIM_MAX as pedal simulator pressure corresponding to the maximum required braking pressure P_MAX.

The pedal simulator pressure P_SIM_A may indicate pedal simulator pressure sensed by the pedal simulator pressure sensing unit 20 at the time that the pedal stroke reaches the first reference pedal stroke STR_A. The required braking pressure P_A decided at the first reference pedal stroke STR_A may indicate required braking pressure decided by applying the first reference pedal stroke STR_A to the 'stroke-pressure relation information'. The maximum required braking pressure P_MAX may indicate the maximum required braking pressure which can be generated by the master cylinder. The maximum pedal simulator pressure P_SIM_MAX may indicate pedal simulator pressure at which the maximum required braking pressure P_MAX is generated.

Therefore, referring to FIG. 3, the required braking pressure P at the second stage may be decided according to Equation 1 below.

$$P = P\_A + \frac{P\_MAX - P\_A}{P\_SIM\_MAX - P\_SIM\_A}(P\_SIM - P\_SIM\_A) \quad \text{[Equation 1]}$$

Next, a process of calculating the required braking pressure at the third stage will be described.

At the third stage indicating a stage from a pedal stroke STR_B sensed by the pedal stroke sensing unit 10 at the time that the required braking pressure P decided while the brake pedal is released at the second stage reaches the required braking pressure P_A to a second is reference pedal stroke STR_C preset to less than the first reference pedal stroke STR_A, the pedal stroke STR sensed by the pedal stroke sensing unit 10 may be used to decide the required braking pressure P.

In order to describe the process of calculating the required braking pressure at the third stage, hysteresis present at the second stage will be first described.

When the brake pedal is released, the pedal simulator pressure may become lower than when the brake pedal is pressed, even though the same pedal stroke is formed. Therefore, when the required braking pressure is decided according to Equation 1 at the second stage, hysteresis may occur between the case in which the brake pedal is pressed and the case in which the brake pedal is released, as illustrated in FIG. 3. Therefore, at the second stage, the required braking pressure when the brake pedal is released may be decided as a smaller value than when the brake pedal is pressed. That is, when the brake pedal is released, the pedal stroke sensed by the pedal stroke sensing unit 10 may be longer than when the brake pedal is pressed, even though the required braking pressure reaches the same required braking pressure. Therefore, when the required braking pressure is decided at the third stage as the subsequent stage after the braking pedal is released at the second stage, the hysteresis which occurs at the second stage needs to be considered.

Figure 4:
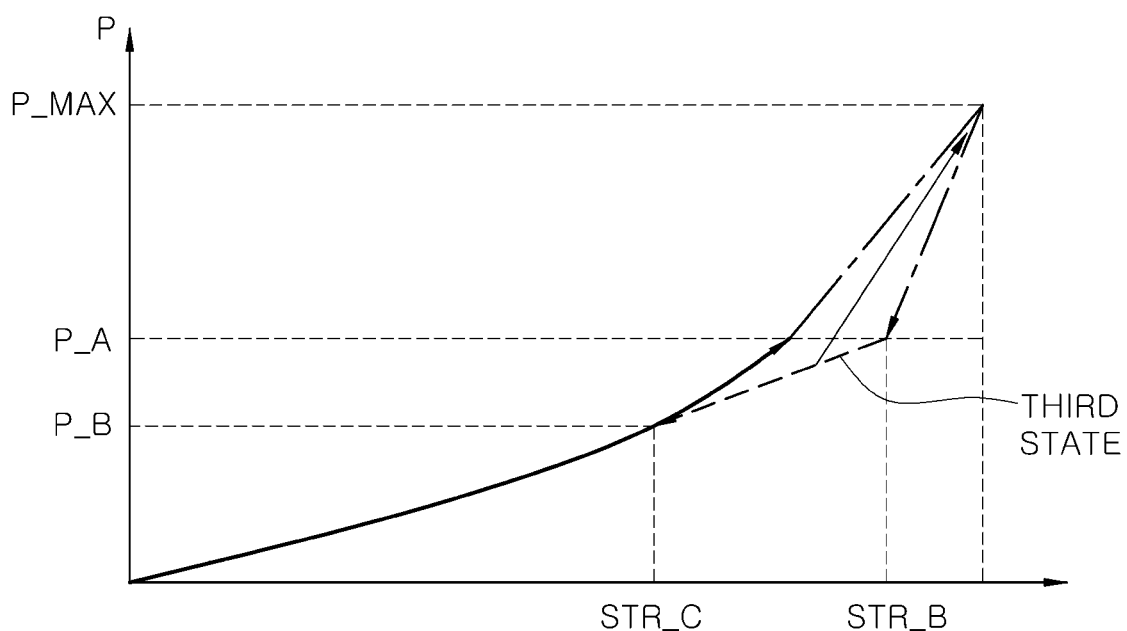

The process of deciding the required braking pressure in consideration of hysteresis which occurs at the second stage will be described in detail with reference to FIG. 4. At the third stage, the control unit 30 may decide the required braking pressure P through the method of applying the pedal stroke STR sensed by the pedal stroke sensing unit 10 to a slope which is decided based on the pedal stroke STR_B, the required braking pressure P_A, the is second reference pedal stroke STR_C, and required braking pressure P_B decided by the 'stroke-pressure relation information' at the second reference pedal stroke STR_C.

Therefore, referring to FIG. 4, the required braking pressure P at the third stage may be decided according to Equation 2 below.

$$P = P\_B + \frac{P\_A - P\_B}{STR\_B - STR\_C}(STR - STR\_C) \quad \text{[Equation 2]}$$

As the required braking pressure is decided according to Equation 2 at the third stage, required braking pressure which maintains a continuous path with the required braking pressure when the brake pedal is released at the second stage may be decided at the third stage, even though hysteresis occurs at the second stage.

The second reference pedal stroke STR_C may be set as a value less than the first reference pedal stroke STR_A in the control unit 30 in advance, and the value may be selected in various manners based on the designer's intention and experimental results.

Next, a process of calculating the required braking pressure at the fourth stage will be described.

At the fourth stage indicating a stage from pedal simulator pressure P_SIM_B sensed by the pedal simulator pressure sensing unit 20 at the time that the brake pedal starts to be repressed while the brake pedal is released at the third stage to the maximum pedal simulator pressure P_SIM_MAX, the pedal simulator pressure P_SIM sensed by the pedal simulator pressure sensing unit 20 may be used to decide the required braking pressure P.

Since the pedal simulator pressure P_SIM_B has a different value from the pedal simulator pressure P_SIM_A described in the above process, the slope needs to be reset in that is the slope calculated at the second stage cannot be used.

Figure 5:
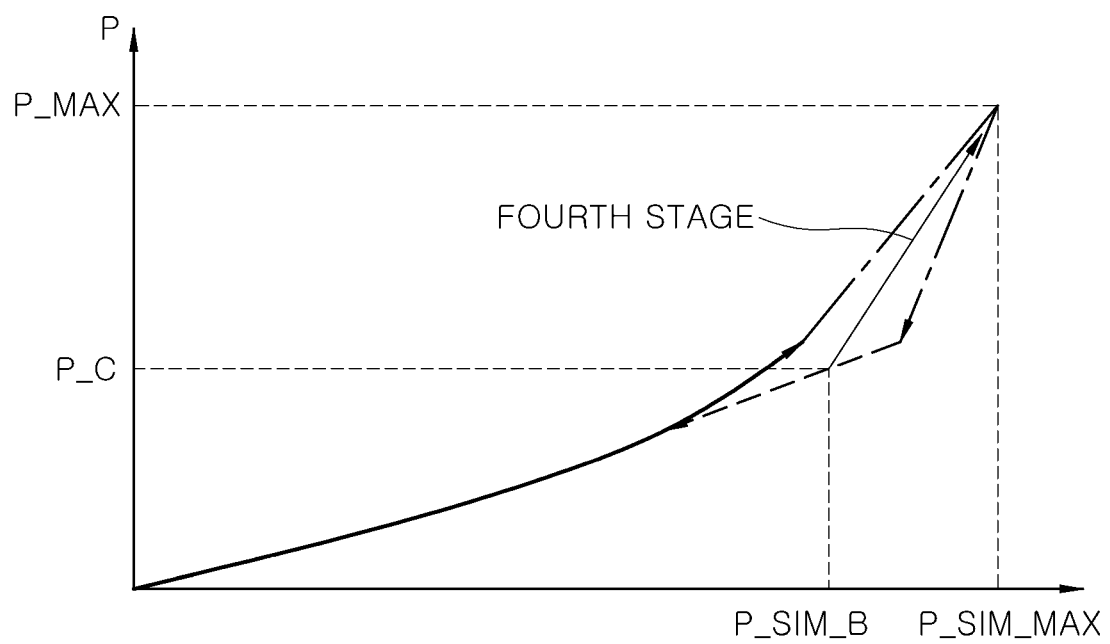

For this operation, referring to FIG. 5, the control unit 30 may decide the required braking pressure P through a method of applying the pedal simulator pressure P_SIM sensed by the pedal simulator pressure sensing unit 20 to a slope which is decided based on the pedal simulator pressure P_SIM_B, required braking pressure P_C decided at the time that the brake pedal starts to be repressed, the maximum pedal simulator pressure P_SIM_MAX, and the maximum required braking pressure P_MAX, at the fourth stage.

Therefore, referring to FIG. 5, the required braking pressure P at the fourth stage may be decided according to Equation 3 below.

$$P = P\_C + \frac{P\_MAX - P\_C}{P\_SIM\_MAX - P\_SIM\_B}(P\_SIM - P\_SIM\_B) \quad \text{[Equation 3]}$$

When the required braking pressures are decided at the first to fourth stages, respectively, the control unit 30 may drive the braking actuator 40 such as an electric booster (motor) to form the required braking pressure through the master cylinder, thereby braking the vehicle.

As can be seen through the process described above, the braking control apparatus in accordance with the present embodiment may decide the required braking pressure by utilizing the pedal stroke, when the brake pedal is pressed and released in a region where the stepping amount of the brake pedal is relatively small, and decide the required braking pressure by utilizing the pedal simulator pressure, when the brake pedal is pressed and released in a region where the stepping amount of the brake pedal is relatively large, thereby reflecting the driver's braking intention into the formation of the required braking pressure. Furthermore, the braking control apparatus may define the plurality of stages while the brake pedal is pressed and released, and decide the required braking pressure through different computation methods at the respective stages, thereby tuning the braking feel and securing the degree of freedom in design.

Figure 6:
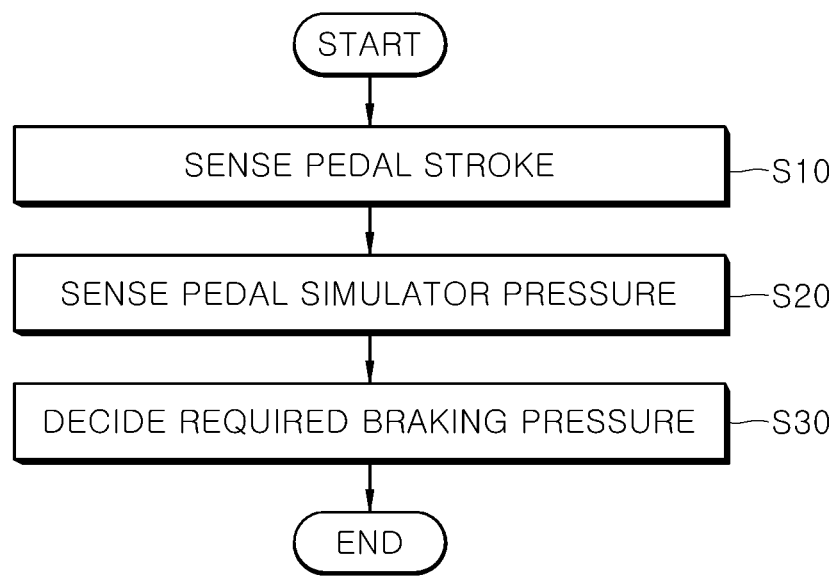
FIG. 6 is a flowchart for describing a braking control method for a vehicle in accordance with an embodiment of the present invention.

FIG. 6 is a flowchart for describing a braking control method for a vehicle in accordance with an embodiment of the present invention.

Referring to FIG. 6, the braking control method for a vehicle in accordance with the embodiment of the present invention will be described. First, the pedal stroke sensing unit 10 may sense a pedal stroke of the brake pedal in step S10, and the pedal simulator pressure sensing unit 20 may sense pressure of the pedal simulator that provides a reaction force in response to a stepping force of the brake pedal in step S20.

Steps S10 and S20 are parallel steps which are performed through independent operations of the pedal stroke sensing unit 10 and the pedal simulator pressure sensing unit 20, and the time series order of the operations is not limited to a specific order.

The control unit 30 may apply different computation methods by selectively utilizing the pedal stroke STR sensed by the pedal stroke sensing unit 10 and the pedal simulator pressure P_SIM sensed by the pedal simulator pressure sensing unit 20 at a plurality of stages defined while the brake pedal is pressed and released, thereby deciding required braking pressure P which is required for braking the vehicle, in step S30.

The plurality of stages may include a first stage in which the pedal stroke is equal to or less than the preset first reference pedal stroke STR_A.

At the first stage of step S30, the control unit 30 may decide the required braking pressure P by applying the pedal stroke STR sensed by the pedal stroke sensing unit 10 to preset 'stroke-pressure relation information'.

The plurality of stages may further include a second stage in which the pedal stroke exceeds the first reference pedal stroke STR_A.

At the second stage of step S30, the control unit 30 may decide the required braking pressure P through a method of applying the pedal simulator pressure P_SIM sensed by the pedal simulator pressure sensing unit 20 to a slope which is decided based on the pedal simulator pressure P_SIM_A sensed by the pedal simulator pressure sensing unit 20 at the first reference pedal stroke STR_A, the required braking pressure P_A decided at the first reference pedal stroke STR_A, the preset maximum required braking pressure P_MAX, and the maximum pedal simulator pressure P_SIM_MAX as pedal simulator pressure corresponding to the maximum required braking pressure P_MAX. Since the process of deciding the required braking pressure according to Equation 1 has been described above, the detailed descriptions thereof will be omitted herein.

The plurality of stages may further include a third stage from a pedal stroke STR_B sensed by the pedal stroke sensing unit 10 at the time that the required braking pressure P decided while the brake pedal is released at the second stage reaches the required braking pressure P_A to a second reference pedal stroke STR_C preset to less than the first reference pedal stroke STR_A.

At the third stage of step S30, the control unit 30 may decide the required braking pressure P through a method of applying the pedal stroke STR sensed by the pedal stroke sensing unit 10 to a slope which is decided based on the pedal stroke STR_B, the required braking pressure P_A, the second reference pedal stroke STR_C, and the required braking pressure P_B decided by the 'stroke-pressure relation information' at the second reference pedal stroke STR_C. Since the process of deciding the required braking pressure according to Equation 2 has been is described above, the detailed descriptions thereof will be omitted herein.

The plurality of stages may further include a fourth stage from the pedal simulator pressure P_SIM_B sensed by the pedal simulator pressure sensing unit 20 at the time that the brake pedal starts to be repressed while the brake pedal is released at the third stage, to the maximum pedal simulator pressure P_SIM_MAX.

At the fourth stage of step S30, the control unit 30 may decide the required braking pressure P through a method of applying the pedal simulator pressure P_SIM sensed by the pedal simulator pressure sensing unit 20 to a slope which is decided based on the pedal simulator pressure P_SIM_B, the required braking pressure P_C decided at the time that the brake pedal starts to be repressed, the maximum pedal simulator pressure P_SIM_MAX, and the maximum required braking pressure P_MAX. Since the process of deciding the required braking pressure according to Equation 3 has been described above, the detailed descriptions thereof will be omitted herein.

When the required braking pressures are decided at the first to fourth stages, respectively, the control unit 30 may drive the braking actuator 40 such as an electric booster (motor) to form the required braking pressure through the master cylinder, thereby braking the vehicle.

The braking control method in accordance with the embodiment of the present invention can decide the required braking pressure by selectively utilizing the pedal stroke and the pedal simulator pressure, thereby tuning the braking feel and securing the degree in freedom in design. Furthermore, the braking control method can reflect an additional braking intention based on the stepping force of the driver into the formation of the required braking pressure.

Although preferred embodiments of the invention have been disclosed for is illustrative purposes, those skilled in the art will appreciate that various modifications, additions and substitutions are possible, without departing from the scope and spirit of the invention as defined in the accompanying claims.

What is claimed is:

1. A braking control apparatus for a vehicle, comprising:
a pedal stroke sensing unit configured to sense a pedal stroke of a brake pedal;
a pedal simulator pressure sensing unit configured to sense pressure of a pedal simulator that provides a reaction force in response to a stepping force of the brake pedal; and
a control unit configured to apply different computation methods by selectively utilizing a pedal stroke STR sensed by the pedal stroke sensing unit and a pedal simulator pressure P SIM sensed by the pedal simulator pressure sensing unit at a plurality of stages defined while the brake pedal is pressed and released, and decide a required braking pressure P which is required for braking the vehicle, wherein:
the plurality of stages comprise:
a first stage in which the pedal stroke is equal to or less than a preset first reference pedal stroke STR A; and
a second stage in which the pedal stroke exceeds the first reference pedal stroke STR A; at the first stage, the control unit decides the required braking pressure P by applying the pedal stroke STR sensed by the pedal stroke sensing unit to preset stroke-pressure relation information; and
at the second stage, the control unit decides the required braking pressure P through a method of applying the pedal simulator pressure P_SIM sensed by the pedal simulator pressure sensing unit to a slope which is decided based on a pedal simulator pressure P_SIM_A sensed by the pedal simulator pressure sensing unit at the first reference pedal stroke STR_A, a required braking pressure P_A decided at the first reference pedal stroke STR_A, a preset maximum required braking pressure P_MAX, and a maximum pedal simulator pressure P_SIM_MAX as a pedal simulator pressure corresponding to the maximum required braking pressure P_MAX.

2. The braking control apparatus of claim 1, wherein the plurality of stages further comprise a third stage from a pedal stroke STR_B, which is sensed by the pedal stroke sensing unit at the time that the required braking pressure P decided while the brake pedal is released at the second stage reaches the required braking pressure P_A, to a second reference pedal stroke STR_C preset to less than the first reference pedal stroke STR_A.

3. The braking control apparatus of claim 2, wherein, at the third stage, the control unit decides the required braking pressure P through a method of applying the pedal stroke STR sensed by the pedal stroke sensing unit to a slope which is decided based on the pedal stroke STR_B, the required braking pressure P_A, the second reference pedal stroke STR_C, and a required braking pressure P_B decided by the relation information at the second reference pedal stroke STR_C.

4. The braking control apparatus of claim 3, wherein the plurality of stages further comprise a fourth stage from a pedal simulator pressure P_SIM_B, which is sensed by the pedal simulator pressure sensing unit at the time that the brake pedal starts to be repressed while the brake pedal is released at the third stage, to the maximum pedal simulator pressure P_SIM_MAX.

5. The braking control apparatus of claim 4, wherein, at the fourth stage, the control unit decides the required braking pressure P through a method of applying the pedal simulator pressure P_SIM sensed by the pedal simulator pressure sensing unit to a slope which is decided based on the pedal simulator pressure P_SIM_B, a required braking pressure P_C decided at the time that the brake pedal starts to be repressed, the maximum pedal simulator pressure P_SIM_MAX, and the maximum required braking pressure P_MAX.

6. A braking control method for a vehicle, comprising:
sensing, by a pedal stroke sensing unit, a pedal stroke of a brake pedal;
sensing, by a pedal simulator pressure sensing unit, pressure of a pedal simulator that provides a reaction force in response to a stepping force of the brake pedal; and
applying, by a control unit, different computation methods by selectively utilizing a pedal stroke STR sensed by the pedal stroke sensing unit and a pedal simulator pressure P SIM sensed by the pedal simulator pressure sensing unit at a plurality of stages defined while the brake pedal is pressed and released, and deciding a required braking pressure P which is required for braking the vehicle, wherein:

the plurality of stages comprise:

a first stage in which the pedal stroke is equal to or less than a preset first reference pedal stroke STR A; and a second stage in which the pedal stroke exceeds the first reference pedal stroke STR A;

in the deciding of the required braking pressure, at the first stage, the control unit decides the required braking pressure P by applying the pedal stroke STR sensed by the pedal stroke sensing unit to preset stroke-pressure relation information; and in the deciding of the required braking pressure, at the second stage, the control unit decides the required braking pressure P through a method of applying the pedal simulator pressure P_SIM sensed by the pedal simulator pressure sensing unit to a slope which is decided based on the pedal simulator pressure P_SIM_A sensed by the pedal simulator pressure sensing unit at the first reference pedal stroke STR_A, a required braking pressure P_A decided at the first reference pedal stroke STR_A, a preset maximum required braking pressure P_MAX, and a maximum pedal simulator pressure P_SIM_MAX as a pedal simulator pressure corresponding to the maximum required braking pressure P_MAX.

7. The braking control method of claim 6, wherein the plurality of stages further comprise a third stage from a pedal stroke STR_B, which is sensed by the pedal stroke sensing unit at the time that the required braking pressure P decided while the brake pedal is released at the second stage reaches the required braking pressure P_A, to a second reference pedal stroke STR_C preset to less than the first reference pedal stroke STR_A.

8. The braking control method of claim 7, wherein in the deciding of the required braking pressure, at the third stage, the control unit decides the required braking pressure P through a method of applying the pedal stroke STR sensed by the pedal stroke sensing unit to a slope which is decided based on the pedal stroke STR_B, the required braking pressure P_A, the second reference pedal stroke STR_C, and a required braking pressure P_B decided by the relation information at the second reference pedal stroke STR_C.

9. The braking control method of claim 8, wherein the plurality of stages further comprise a fourth stage from a pedal simulator pressure P_SIM_B, which is sensed by the pedal simulator pressure sensing unit at the time that the brake pedal starts to be repressed while the brake pedal is released at the third stage, to the maximum pedal simulator pressure P_SIM_MAX.

10. The braking control method of claim 9, wherein in the deciding of the required braking pressure, at the fourth stage, the control unit decides the required braking pressure P through a method of applying the pedal simulator pressure P_SIM sensed by the pedal simulator pressure sensing unit to a slope which is decided based on the pedal simulator pressure P_SIM_B, a required braking pressure P_C decided at the time that the brake pedal starts to be repressed, the maximum pedal simulator pressure P_SIM_MAX, and the maximum required braking pressure P_MAX.

* * * * *